United States Patent [19]

Satoh et al.

[11] Patent Number: 4,833,663

[45] Date of Patent: May 23, 1989

[54] INFORMATION RECORDING/REPRODUCING APPARATUS FOR HANDLING DEFECTIVE SECTORS ON AN OPTICAL DISK

[75] Inventors: Isao Satoh, Neyagawa; Makoto Ichinose, Sakai; Yoshihisa Fukushima, Osaka; Yuzuru Kuroki, Toyonaka; Yuji Takagi, Neyagawa, all of Japan

[73] Assignee: Matsushita Electric Industrial Co., Ltd., Osaka, Japan

[21] Appl. No.: 3,820

[22] Filed: Jan. 16, 1987

[51] Int. Cl.4 .......................... G11B 5/09; G11B 27/10
[52] U.S. Cl. ........................................ 369/32; 360/49; 360/72.2; 360/32; 369/54; 369/59
[58] Field of Search ........................ 360/32, 40, 48, 49, 360/53, 72.2, 38.1; 369/54, 58, 59, 32, 48; 358/336

[56] References Cited

U.S. PATENT DOCUMENTS

| | | | |
|---|---|---|---|
| 4,405,952 | 9/1983 | Slakmon | 360/49 |
| 4,434,487 | 2/1984 | Rubinson et al. | 360/53 |
| 4,488,277 | 12/1984 | McFarlane et al. | 369/54 |
| 4,647,991 | 3/1987 | Zangenehpour | 360/48 |
| 4,669,075 | 5/1987 | Abe | 369/59 |
| 4,706,136 | 11/1987 | Wentzel et al. | 360/53 |
| 4,730,290 | 3/1988 | Takasago et al. | 369/54 |

Primary Examiner—Alan Faber
Assistant Examiner—Surinder Sachar
Attorney, Agent, or Firm—Stevens, Davis, Miller & Mosher

[57] ABSTRACT

Disclosed is an information recording/reproducing apparatus which uses a rewritable recording medium having a sector structure, and in which a data writing gate signal and a data erasing gate signal are reproduced on the basis of an ID detection signal of a target sector, while a data reading gate signal and a marking gate signal are produced on the basis of the ID detection signal of the target sector or on the basis of an ID detection signal of a sector located N sectors before the target one, so that when data is to be renewed in a specific sector from which no ID detection signal can be obtained, marking is performed in the specific sector on the basis of an ID detection signal of a sector located N sectors before the specific sector and new data are rewritten into a substitutive sector, whereby it is possible to perform data erasing and data recording in a target sector with high reliability and high positional accuracy and it is possible to shorten gaps respectively in front and rear of a data field to thereby make it possible to efficiently use a data area.

1 Claim, 7 Drawing Sheets

FIG. 7
PRIOR ART

INFORMATION RECORDING/REPRODUCING APPARATUS FOR HANDLING DEFECTIVE SECTORS ON AN OPTICAL DISK

BACKGROUND OF THE INVENTION

1. Field of the Invention

The present invention generally relates to an information recording/reproducing apparatus in which a rewritable optical or a rewritable optical magnetic disk having a sector structure is used, and particularly relates to an information recording/reproducing apparatus in which it is made possible to erase data in a sector having information recorded therein even in the case where the data in the ID field of the sector cannot be read or an error is generated therein.

2. Description of the Related Art

Figure 5:
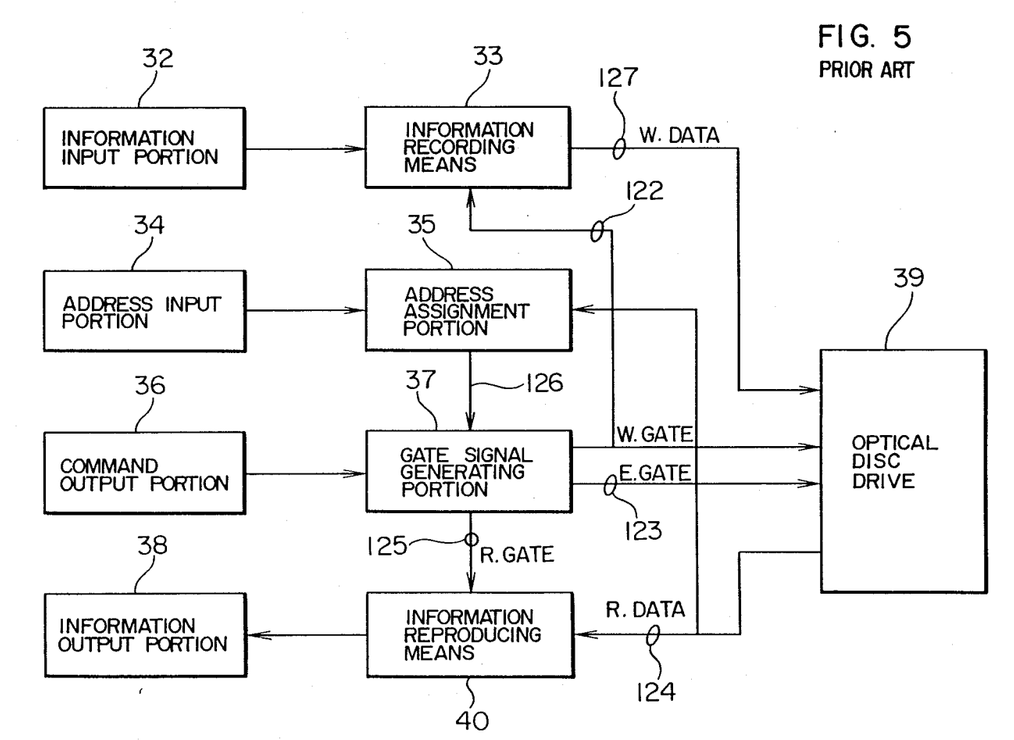
FIG. 5 is a block diagram showing the previously proposed information recording/reproducing apparatus.

FIG. 5 is a block diagram showing a known information recording/reproducing apparatus which comprises an information input portion 32 for receiving externally applied information to be recorded; information recording means 33 for producing a recording signal 127 modulated with the received information; an address input portion 34 for receiving an externally applied address of a sector on or from which information is recorded or reproduced; an address assignment portion 35 for assigning an address of a sector on or from which information is recorded or reproduced and for comparing the assigned address with that of a target sector to judge where there exists coincidence therebetween; a command output portion 36 for producing a writing command, a reading command and an erasing command; a gate signal generating portion 37 for generating a writing gate signal 122, a reading gate signal 125 and an erasing gate signal 123 on the basis of an ID detection signal 126 obtained when an ID field of a target sector is detected in the address assignment portion 35 and a command from the command output portion 36; information reproducing means 40 for demodulating a reproduction signal 124; an information output portion 38; and an optical disk drive 39.

Figure 6:
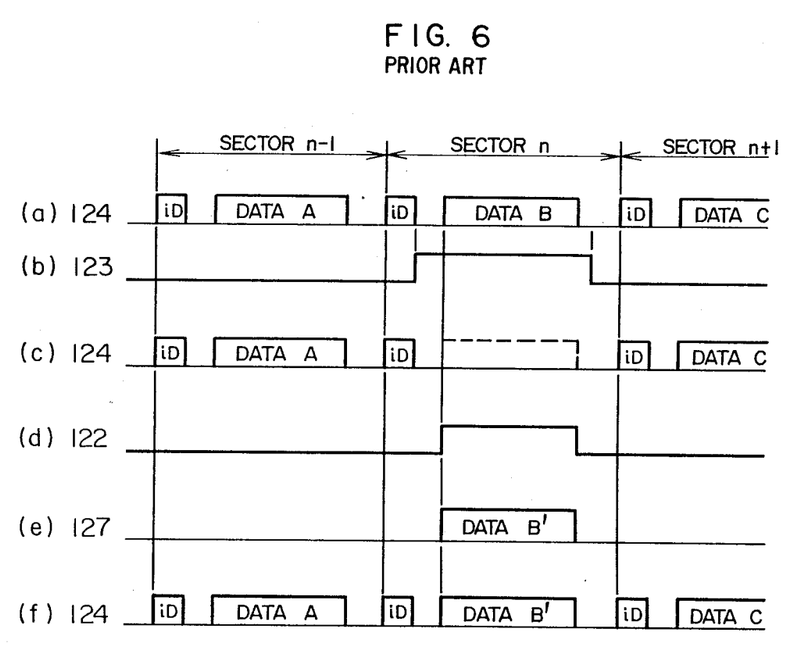
FIG. 6 is a diagram consisting of (a)-(f) showing waveforms of signals in the file renewing operation in the apparatus of FIG. 5.

FIG. 6 shows waveforms of various signals for explaining the state in which information is rewritten to be renewed in the thus arranged information recording/reproducing apparatus. Description will be made hereunder as to a case where the sector n−1, the sector n, and the sector n+1 have data A, B, and C written therein respectively, and the data B written in the sector n are substituted by data B'. The diagram (a) in FIG. 6 shows the waveform of the reproduction signal 124. First, when an address of the sector n from which the data B are to be erased is applied to the address input portion 34, an ID field (composed of address information and an error detection code thereof) of the sector n is detected by the address assignment portion 35, and the thus obtained ID detection signal 126 is applied to the gate signal generating portion 37. An erasing command is produced from the command output portion 36 and transferred to the gate signal generating portion 37, so that the erasing gate signal 123 is applied to the optical disk drive 39 at the timing as shown in the diagram (b) of FIG. 6 to cause the optical disk drive 39 to erase the data B in the sector n. The diagram (c) of FIG. 6 shows the waveform of the reproduction signal 124 after erasion in the sector n.

Next, the data B' are written into the sector n. The diagram (d) of FIG. 6 shows the waveform of the writing gate signal 122 at this time and the data B' carried by the recording signal 127 shown in the diagram (e) of FIG. 6 are written into the sector n. The diagram (f) of FIG. 6 shows the reproduction signal 124 when the data B has been substituted by the data B' in the sector n.

Figure 7:
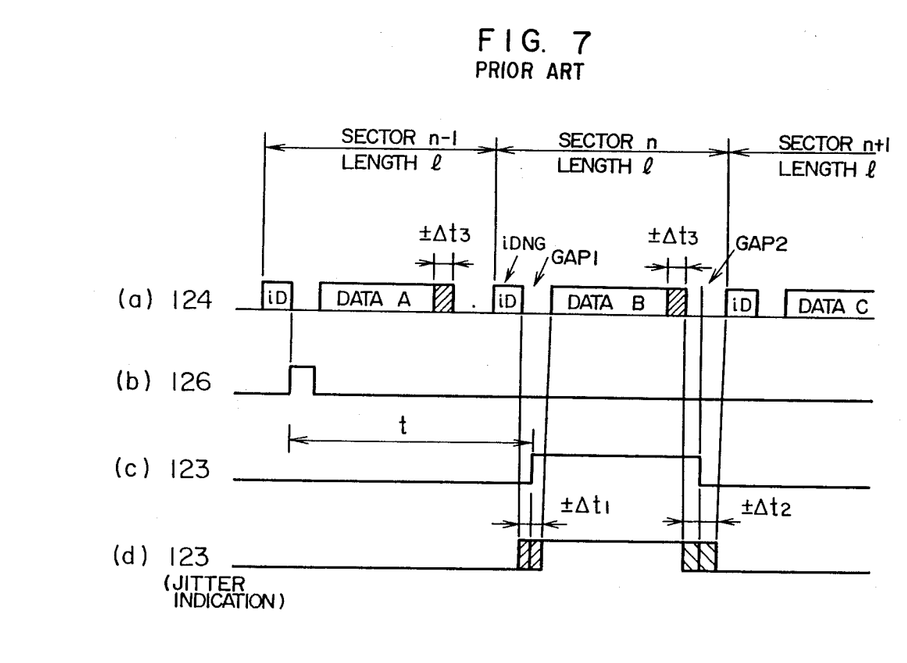
FIG. 7 is a diagram consisting of (a)-(d) showing singnal waveforms in erasing data in a sector.

In such an arrangement as described above, however, it is impossible to erase data in the sector n, when an error is detected in the ID field of the sector n. FIG. 7 shows a proposal of improvement for solving this problem. An ID field of the sector n−1 preceding the sector n to be erased is detected by the address assignment portion 35 to obtain the ID detection signal 126 as shown in the diagram (b) of FIG. 7, and the erasing gate signal 123 as shown in the diagram (c) of FIG. 7 is generated by the gate signal generating portion 37 on the basis of the ID detection signal 126. This erasing gate signal 123 is delayed from the ID detection signal 126 by time t corresponding to a sector length. This proposal of the improvement has following problems.

In an optical disk mounted on the optical disk drive 39, a disc plane velocity v is deviated due to eccentricity, fluctuations in revolutional speed of a motor, vibrations, shocks, mechanical accuracy, etc., by several percents when converted into a revolutional speed thereof. Further, it may be assumed that the optical disk is accurately divided into sectors each having a sector length l by means of a cutting machine, and the time t for every sector in the reproduction signal 124 can be represented by l/v, so that the time t may be deviated by several percents.

The diagram (d) of FIG. 7 shows a deviation in pulse position in the case where the erasing gate 126 is generated at the ID field of the sector n−1. In the diagram, the jitter time at the leading and trailing edges of the erasing gate signal 123 is represented by $\Delta t_1$ and $\Delta t_2$ respectively, the latter being twice as long as the former. The jitter time is established so that $\pm \Delta t_1 = \pm 20$ μs and $\pm \Delta t_2 = \pm 42$ μs under the conditions that the number of revolution is 1800 rpm, the number of sectors is 32 sectors/track, and the deviation in revolutional speed is ±2%. Similarly to this, in recording, data are recorded with jitter time $\pm \Delta t_3$ which is approximately equal to $\pm \Delta t_1$. It is therefore necessary to provide gaps of a length of 15.4% of a sector, that is {2×(20+40+20) μs/1.04ms}, in order to cause the erasing gate signal 123 to contain all the data so as not to be overlapped on the ID fields. This means a loss of 15.4% in storage capacity. Further, the jitter time causes partial differences in number of times of erasion in the gaps 1 and 2 at the leading and trailing edges of the erasing gate signal 123 on the medium of a disk, so that there has been such a disadvantage that signal processing at ID field and SYNC (synchronization) portion of data is made difficult because of disturbance in reflectance due to differences in fatigue of the medium.

SUMMARY OF THE INVENTION

It is therefore an object of the present invention to eliminate the foregoing disadvantages in the prior art.

It is another object of the present invention to provide an information recording/reproducing apparatus in which data in a target sector can be efficiently substituted by new data even if there exists an error in an ID field of the target sector when the old data are erased, and the generation of variations in reflectance at gap portions due to fatigue of a medium is limited to a short period.

In order to attain the above objects, according to an aspect of the present invention, the information recording/reproducing apparatus for an optical disk in which data are repeatedly recorded, reproduced, and erased in every sector provided with an identifier field having an ability of error detection, comprises: recording means for recording information onto the optical disk by the sector while adding an error correction detection code to the sector information, when information is recorded onto the optical disk; reading means for reproducing the recorded information from the optical disk by the sector while correcting errors; recorded means for erasing information on the optical disk by the sector; marking signal writing/reading means for writing a marking signal which can be detected in a data reproducing operation and for detecting the marking signal in the data reproducing operation; identifier detecting means for detecting an identifier field of a target sector to produce an identifier detection signal when the identifier field is detected; identifier delay means for delaying the identifier detection signal of the identifier detecting means by a time corresponding to a length of one sector; command generating means for generating a writing command, a reading command, an erasing command, and a marking command for the respective sector; and gating signal generating means for generating a writing gate signal, a reading gate signal, an erasing gate signal, and a marking gate signal on the basis of the identifier detection signal of the identifier detecting means and an output of the command generating means, and for generating a reading gate signal and a marking gate signal on the basis of the output of the command generating means and a delayed identifier detection signal which is obtained such that an ID field of a sector which is − (minus) N-th from a target sector (N being a positive integer) is detected and the thus obtained identifier detection signal is delayed by the identifier delay means.

In the thus arranged information recording/reproducing apparatus according to the present invention, data in a target sector is erased by generating the erasing gate signal on the basis of normal detection of an ID field of the target sector and the erasing command from the command means. In the case where the target sector has a defective ID field, an ID field of a sector which is −(minus) N-th from the target sector is detected so as to obtain an ID detection signal, and the marking gate signal is generated on the basis of another ID detection signal which is obtained such that the first-mentioned ID detection signal is delayed by a length corresponding to N sector lengths and a marking command output from the command means to thereby write a marking signal in the target sector. Information, which should be recorded in the target sector having a defective ID field, is recorded in the substitutive sector by generating the writing gate signal on the basis of normal detection of an ID field of a substitute sector and a writing command from the command means.

In reading the sector, the foregoing marking signal is detected, so that it is found that the sector is substitute sector.

The above and other objects, features and advantages of the present invention will be apparent from the following detailed description taken in conjunction with the accompanying drawings.

DESCRIPTION OF THE PREFERRED EMBODIMENTS

Figure 1:
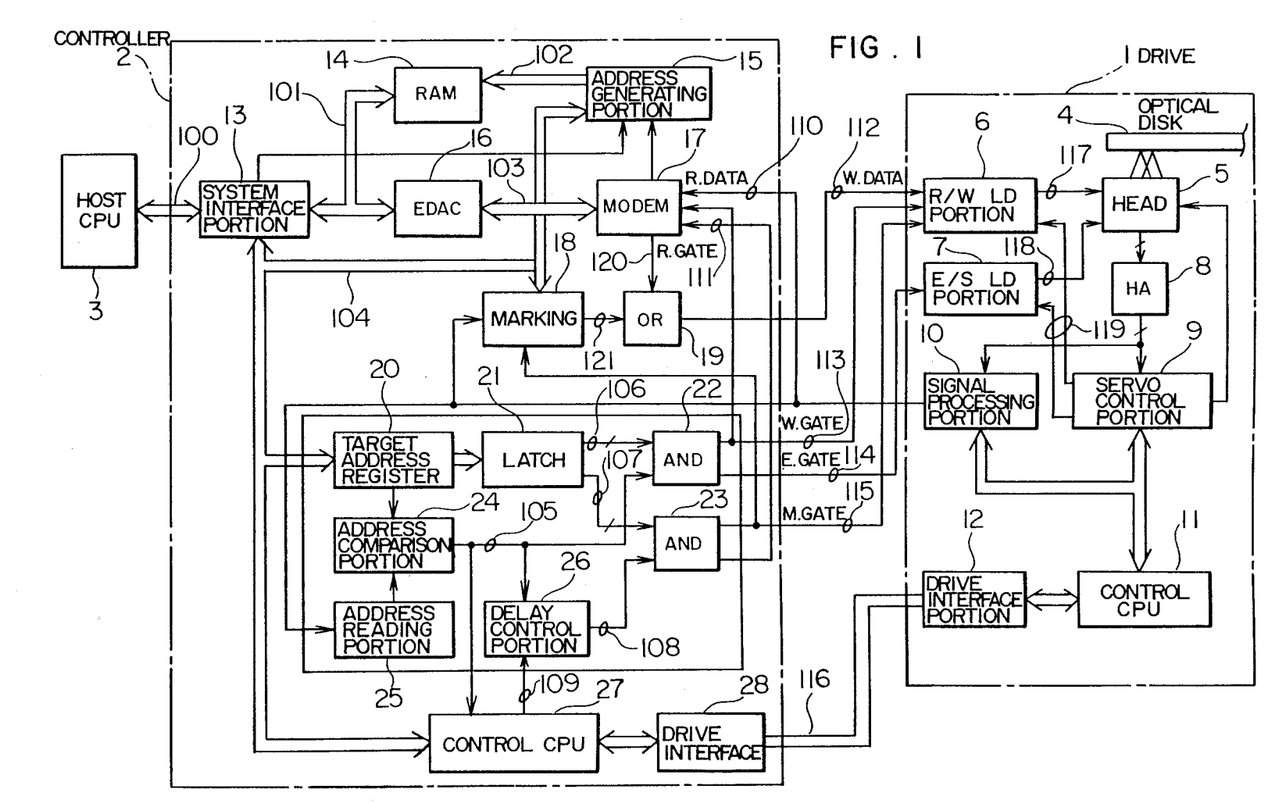
FIG. 1 is a block diagram showing an embodiment of the information recording/reproducing apparatus according to the present invention.

FIG. 1 is a block diagram showing an embodiment of the information recording/reproducing apparatus according to the present invention. In the drawing, the information recording/reproducing apparatus is constituted by a drive 1 for performing recording/reproducing/erasing of a signal onto/from an erasable optical disk 4; a controller 2 for performing control of sending-out of format data to the drive 1, control of error correction, control of sector management, and control of writing/reading/erasing/ marking operations; and a host CPU 3 for generating a request of writing or reading.

The drive 1 comprises an optical head 5 for recording, reproducing and erasing a signal; a reading/writing laser drive portion 6; an erasing laser drive portion 7; a head amplifier 8 for amplifying a reproduction signal which is reproduced from the erasable optical disk 4 by the optical head 5; a servo control portion 9 for performing focusing servo or tracking servo with respect to guide tracks of the erasable optical disk 4 on the basis of a focus error signal or a tracking error signal from the head amplifier 8; a signal processing portion 10 for performing waveform equalization and binary-coding of the reproduction signal from the head amplifier 8; a control CPU 11 for performing system-control of the drive 1; and a drive interface portion 12. In the drawing, a disk motor portion and a linear motor portion are omitted.

The controller 2 comprises: a system interface portion 13; a random access memory (RAM) 14; an address generating portion 15 for performing interleave and deinterleave processing in writing/reading information in an address portion of the RAM 14; an error detection correction portion (EDAC) 16 for performing encoding/decoding of information by using an error correction detection code; a digital modulation/demodulation portion (MODEM) 17 for digitally modulating/demodulating information having an error correction detection code added thereto; a marking signal generating/detecting portion 18; and OR gate 19; a target address register 20 for storing an address of a target sector; a latch 21 for setting a command; AND-gate portions 22 and 23; and address comparison portion 24; and address reading portion 25 for reading address information out of an address signal in an ID field of a sector; a delay control portion 26; a control CPU 27 for performing system-control of the controller 2; and a drive interface 28.

In the apparatus, the respective circuit components are connected to each other through a system bus signal line 100; an internal data bus signal line 101; an RAM address signal line 102; an internal data bus signal line 103; a CPU bus signal line 104; and ID detection signal line 105; a writing/erasing command line 106; a reading-/marking command line 107; a delay ID detection signal line 108; a delay time control signal line 109; a reading data signal line 110; a reading gate signal line 111; a writing data signal line 112; a writing gate signal line 113; an erasing gate signal line 114; a marking gate signal line 115; a drive control interface signal line 116; a recording/reproducing laser drive signal line 117; an erasing laser drive signal line 118; a control signal line 119 for setting power for the recording/reproducing laser and the erasing laser; a modulation signal line 120; and a marking signal line 121.

Next, description will be made as to the operation of the thus arranged information recording/reproducing apparatus according to the present invention.

Figure 2:
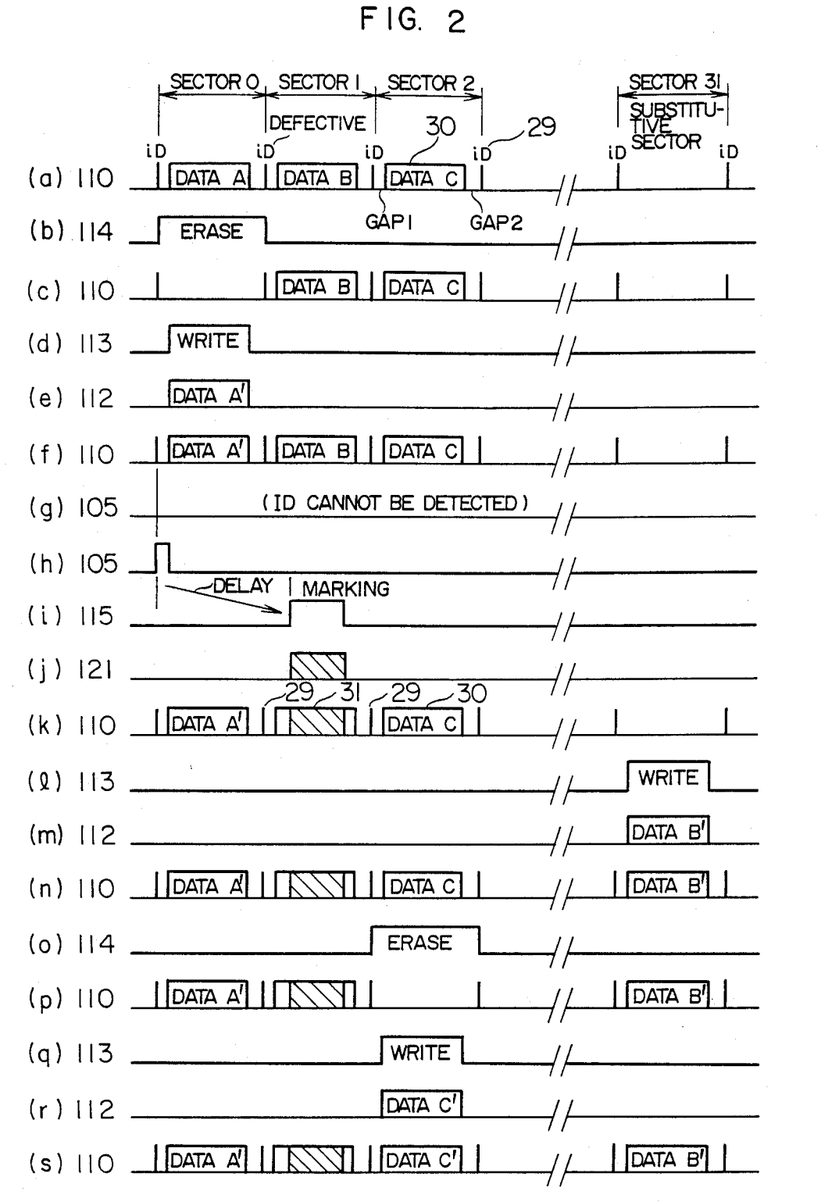
FIG. 2 is a diagram consisting of (a)-(s) showing waveforms of signals in the file renewing operation in the embodiment of FIG. 1.

Assuming that, as shown in FIG. 2, a track is composed of 32 sectors; data A, B, and C are written in a sector 0, a sector 1 and a sector 2 respectively; a sector 31 is assigned as a substitute sector. Description will be made, by way of example, as to the case where the data A, B, and C are to be renewed and the sector 1 has a defective ID field. As shown in the diagram (a) of FIG. 2, the respective data A, B, and C recorded on the sector 0, the sector 1 and the sector 2 are read out on the reading data signal line 110.

[1] Rewriting Operation in the Sector 0

(1) Writing command for rewriting the data A, B, and C in the sectors 0, 1, and 2 is transferred from the host CPU 3 to the control CPU 27 in the controller 2.

(2) The host CPU 3 transfers data A' to the RAM 14 through the system bus signal line 100, the system interface portion 13, and the internal bus signal line 101.

(3) The control CPU 27 sends a seeking command to the drive 1 through the drive interface signal line 116, and the drive 1 actuates the optical head 5 to move onto a target track on the basis of the seeking command.

(4) The control CPU 27 sets the erasing command in the latch 21 and sets the address of the sector 0 in the target address register 20. When the sector 0 comes directly above the optical head 5, the ID detection signal line 105 and the erasing gate signal line 114 (the diagram (b) in FIG. 2) are activated by the address comparison portion 24 and the AND gate portion 22 respectively. The erasing gate signal line 114 actuates the erasing laser drive portion 7 to drive the erasing laser of the optical head 5 to thereby erase the data A in the sector 0. The diagram (c) in FIG. 2 shows the waveform of a signal on the reading data signal line 110 after erasure operation.

(5) Next, the control CPU 27 cause the error correction detection portion 16 to encode the data A' in the RAM so as to add the error correction detection code to the data A', and stores the thus coded data A' in the RAM 14 again. The control CPU 27 sets the address of the sector 0 in the target address register 20 and sets the writing command in the latch 21. When the optical head 5 comes directly above the sector 0, the ID detection signal line 105 is turned-on, and the writing gate signal line 113 (the diagram (d) in FIG. 2) is activated by the AND gate portion 22. The writing gate signal line 113 actuates the digital modulation/demodulation portion 17 to read the data A' out of the RAM 14 while performing interleaving in the address generating portion 15, and the thus read-out data A' is sent onto the modulation signal line 120 as well as onto the data signal line 112 (the diagram (e) in FIG. 2) through the OR gate portion 19. The writing data signal line 112 and the writing gate signal line 113 actuate the recording/reproducing laser drive portion 6 to drive the recording-/reproducing laser of the optical head 5 to thereby write the data A' into the sector 0 (the diagram (f) in FIG. 2).

[2] Rewriting Operation in the Sector 1 Having Defective ID Field.

(1) The control CPU 27 requires the host CPU 3 to transfer new data and the host CPU 3 transfers the data B'.

(2) The control CPU 27 sets the erasing command in the latch 21, sets the address of sector 1 in the target address register 20, and waits for generation of an ID field detection pulse which will appear on the ID detection signal line 105 upon completion of the erasing operation. No ID detection pulse, however, is produced on the ID detection signal line 105 as shown in the diagram (g) of FIG. 2 because of a defective ID field of the sector 1. The control CPU 27 is noted, by a time-out error, that the ID field of the sector 1 could not be detected.

(3) The control CPU 27 sets the address of the sector 0 in the target address register 20, sets the marking command in the latch 21, and sets a one-sector length delay in the delay control portion 26 through the delay time control signal line 109. When the optical head 5 comes directly above the sector 0, the ID detection signal line 105 is activated (the digram (h) of FIG. 2), and a delay ID detection signal which is delayed by the delay control portion 26 by a length corresponding to one sector length is produced onto the signal line 108, so that the marking gate signal line 115 is activated (the diagram (i) of FIG. 2) through the AND gate 23. The marking gate signal line 115 actuates the marking signal generating/detecting portion 18 so as to produce a marking signal to the signal line 121 (the diagram (j) of FIG. 2). The marking signal transferred onto the writing signal data line 112 through the OR gate portion 19. The marking gate signal line 115 and the writing data signal line 112 actuate the recording/reproducing laser drive portion 6 to drive the recording/reproducing laser of the optical head 5 to thereby write the marking signal into the sector 1 (the diagram (k) in FIG. 2).

(4) The control CPU 27 writes the data B' into the sector 31 acting as a substitute sector (the diagrams (l) – (n) in FIG. 2).

[3] Rewriting Operation in the Sector 2

As shown in the diagrams (o)–(s) of FIG. 2, the rewriting operation is performed in the same manner as that in the sector 0, which has been described in detail in the item [1], excepting that the new data is C' and the sector is the sector 2.

Figure 3:
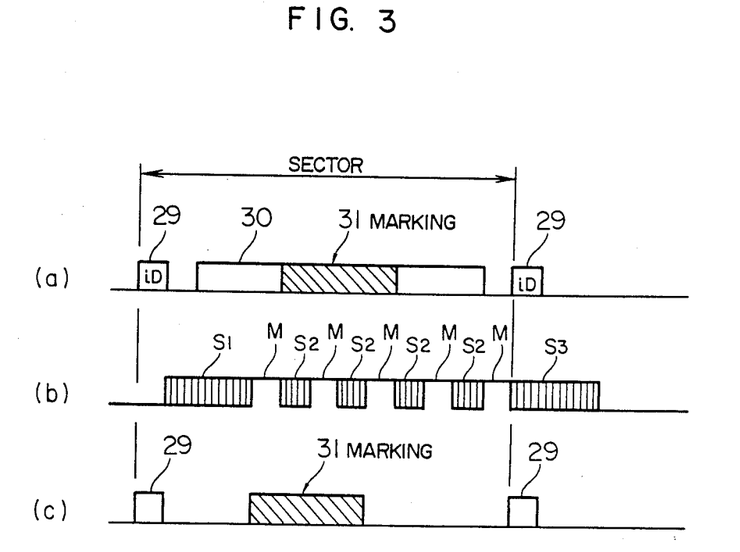
FIG. 3 is diagram consisting of (a)-(c) showing waveforms of signals in an embodiment of the marking signal.

FIG. 3 shows an embodiment of the marking signal. In the drawing, a sector comprises an ID field 29 carrying information such as a track address, a sector address and a CRC code, a data field 30, and a marking portion 31. The diagram (a) in FIG. 3 shows an example in which a marking signal 31 is superimposed on the data field 30, and the diagram (c) in FIG. shows a waveform of a signal on the reading data signal line 110 showing an example in which a marking signal 31 is written in the unwritten data field, 30 which has been erased. The diagram (b) in FIG. 3 shows an embodiment of the marking signal which is a pulse train composed of high frequency-gated space portions $S_1$, $S_2$, and $S_3$ and mark portions M. The space portions $S_1$ and $S_3$ are provided for simplifying the circuit arrangements of the recording/reproducing laser drive portion 6, the head amplifier 8, and the signal processing portion 10. A row of recording dots constituting the data field 30 are rerecorded in the form of an elongated dot in the mark portions M. Only an exceedingly small part of the recording dot row constituting the data field 30 is rerecorded in the space portions $S_1$, $S_2$ and $S_3$ because those space portions are high frequency gated. Therefore, the recording dot row in the space portions is sufficiently shorter than that of the marking portions M, so that it is easy to distinguish the space portions from the mark portions M. Further, if the length of each of the mark portions M is made to be an integer times as long as that of the space portion $S_2$, it is possible to record information in the marking portion in the form of a combination of the mark portions M and the space portions. By the use of a plurality of marking signals, it is possible to judge whether a substitute sector exists in the same track i.e. substitute sector in FIG. 2, or in a substitute track, and to identify a sector having an ID field which is not yet detected in writing operation. As disclosed in United States patent application Ser. No. 673,620, the marking portion 31 is easily detected, for example, by a serial port (for example, a serial port of 8051 CPU made by Intel Corp.), which is generally used for asynchronous communication, and therefore the accuracy in recording position of the marking signal may be relatively low because the marking portion 31 may be contained in the data field 30.

Further, the jitter time at the leading edge of the erasing gate signal is substantially equal to zero because the erasing gate signal is produced at the timing when an ID field of a target sector is detected, and the jitter time at the trailing edge, on the other hand, is ±20 μsec under the conditions that the number of revolution of the disc is 1800 rpm, the density of sectors is 32 sectors/track, and the fluctuation in revolution is 2%, so that the positional accuracy of the erasing gate signal is remarkably improved in comparison with recovery from the sector which is − (minus) N-th from the target sector. As described above, according to the present invention, the positional accuracy of the erasing gate signal is remarkably improved, and therefore the portion where the number of times of erasing operations varies in each of the respective gaps 1 and 2 in front of and in the rear of the data portion can be limited to be narrow to thereby make signal processing easy.

Figure 4:
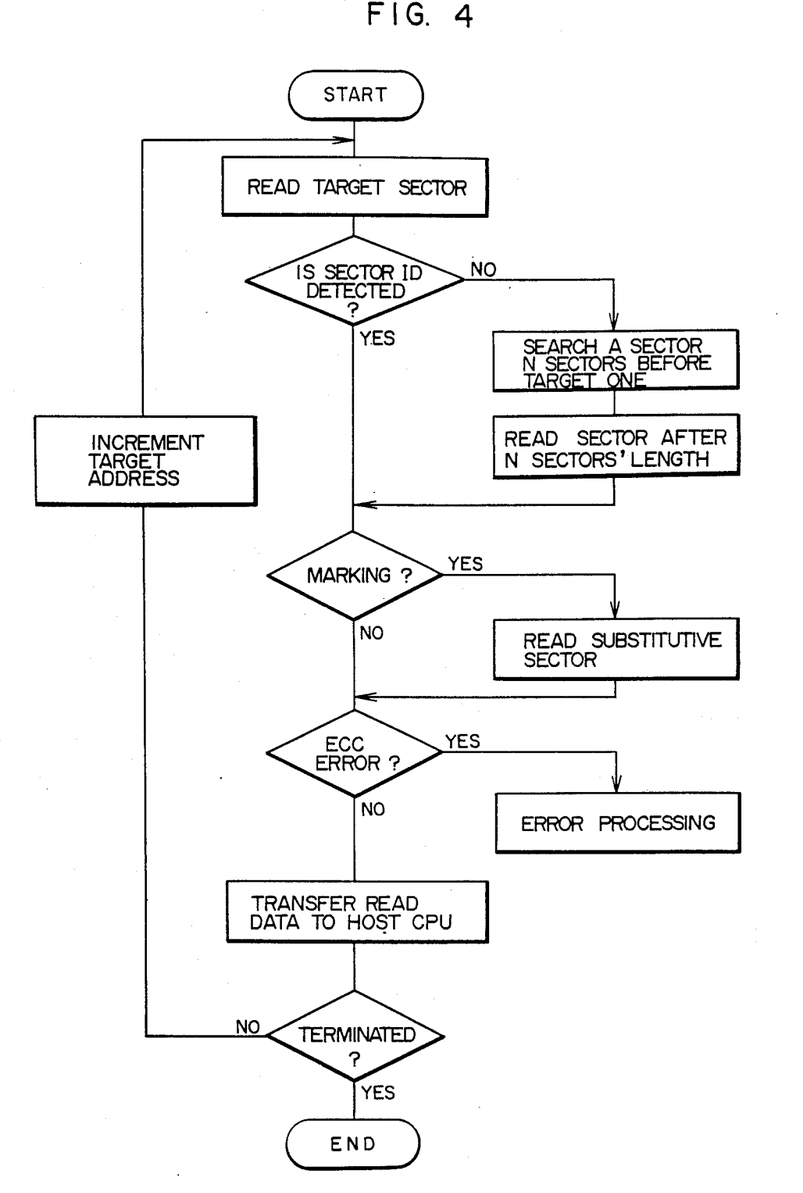
FIG. 4 is a flowchart for reading information.

FIG. 4 is a flowchart for reading data in a sector in this embodiment. The flowchart shows a case where it is assumed that all ID fields are detected in a writing operation and a substitutive sector does not have a defective ID field and is not subject to marking processing.

(1) The controller 2 requires the drive 1 to seek a target track.

(2) The control CPU 27 sets an address of a target sector in the target address register 20, sets a reading command in the latch 21, and waits for completion of reading of the target sector.

(3) If the target sector has a defective 10 field, it is determined that the sector has an ID field which cannot be detected, and therefore the control CPU 27 sets the address of a sector which is − (minus) N-th from the target section in the target address register 20, sets a reading command in the latch 21, sets a delay time corresponding to the N sector lengths in the delay control portion 26, and reads the data out of the target sector.

(4) When a marking signal is detected in the sector reading operation, the sector is substituted and therefore the data is read out of the substitutive sector.

(5) The read-out data are subject to error correction through the error correction detection portion 16 and stored in the RAM 14. When uncorrectable error is detected, the operation is branched to error processing.

(6) The data in the RAM 14 is transferred to the host CPU 3.

(7) The operations (2) to (6) are repeated by the number of times corresponding to the number of the assigned sectors.

According to the flowchart of FIG. 4, even if a target sector has an ID field which cannot be detected in the data reading operation, it is possible to read the data out of the target sector by making access to a sector which is − (minus) N-th from the target sector. Even if the reading gate signal at this time is overlapped by the rear field of the data portion of a preceding sector or by the front portion (a synchronizing field) of the data portion of a succeeding sector, the digital modulation/demodulation portion 17 is hardly actuated to start modulation. If the digital modulation/demodulation portion 17 is actuated to start modulation, error detection is carried out by an error correction detection code in the data. That is, the positional accuracy of the reading gate signal may be considerably low.

In the foregoing embodiment, specifically, the number N may be selected to be 1 or 2. The rate of error in ID detection is $10^{-3}$ order in the case of an optical disk, and therefore in the case where recovery processing of the sector − (minus) N-th from a target sector is performed, the rate of error in ID detection is $10^{-6}$ order when N=1, and $10^{-9}$ order when N=2.

Further, although description has been made above as to the case where a sector is thermally erased by using an erasing laser in this embodiment, it is a matter of course that the information recording/reproducing apparatus according to the present invention can be applied to an optical magnetic medium by using magnetic field application means in place of the erasing laser and simultaneously using a recording/reproducing laser.

As described above, according to the present invention, when a target sector has an ID field which cannot be detected, a data field of the sector can be correctly erased with high positional accuracy by marking this sector so as to substitute it by a substitutive sector. Therefore, there are such advantages in practical use that partial disturbance in a reflectance due to differences in the number of times of erasing operations in the gap portions can be reduced and there is no risk of erroneous erasing operation due to track jumping because an ID field of a sector to be erased is directly detected to be used to thereby obtain high reliability.

What is claimed is:

1. An information recording/reproducing apparatus for an optical disk having sectors, each sector including an identifier field portion and a data field portion, said apparatus comprising:
   means for writing data onto a disk sector;
   means for reading data from a disk sector;
   means for erasing data from a disk sector;

identifier detection means for detecting an identifier field of data read by said reading means from a target sector;

means responsive to the detection of an identifier field of a target sector for permitting the reading, writing and erasing of data to and from said target sector;

means for determining when the identifier detection means cannot detect the identifier field of a target sector and, in response thereto, for selecting, for reading by said reading means, another sector preceding said target sector which is N sectors removed from said target sector, where N is an integer;

means responsive to said identifier detecting means detecting an identifier field of data read by said reading means from said preceding sector and for providing an identifier detection signal which is delayed by a time corresponding to N times a length of one sector;

means responsive to said delayed identification detection signal for writing an identifiable marking signal containing substitute sector information in a data field portion of said target sector, when said identifier detecting means cannot detect the identifier field portion of the target sector; and, means for detecting a read marking signal from said target sector and reading the substitute sector information contained therein.

* * * * *